United States Patent [19]

Narayan et al.

[11] Patent Number: 4,904,034
[45] Date of Patent: * Feb. 27, 1990

[54] SCANNING APPARATUS

[76] Inventors: Badhri Narayan; James E. Roddy; Richard A. Stark, all of 901 Elmgrove Rd.; Dennis A. Thompson, 121 Lincoln Ave., all of Rochester, N.Y. 14650

[*] Notice: The portion of the term of this patent subsequent to Nov. 17, 2004 has been disclaimed.

[21] Appl. No.: 150,469

[22] Filed: Jan. 29, 1988

Related U.S. Application Data

[63] Continuation of Ser. No. 848,426, Apr. 4, 1986, abandoned.

[51] Int. Cl.[4] ..................... G02B 26/10; G02B 5/32
[52] U.S. Cl. ................................. 350/3.71; 350/3.72
[58] Field of Search ..................... 350/3.71, 421, 286, 350/287, 3.72; 372/44, 100, 101

[56] References Cited

U.S. PATENT DOCUMENTS

| | | | |
|---|---|---|---|
| 2,436,148 | 2/1948 | Maurer, Jr. | 88/24 |
| 2,613,127 | 10/1952 | Geiser | 346/109 |
| 3,750,189 | 7/1973 | Fleischer | 346/74 |
| 3,758,783 | 9/1973 | Sick et al. | 250/219 |
| 3,877,777 | 4/1975 | Glenn, Jr. | |
| 4,016,504 | 4/1977 | Klauminzer | 372/100 |
| 4,081,760 | 3/1978 | Berg | 372/100 |
| 4,084,881 | 4/1978 | Hirabayashi et al. | 350/6.8 |
| 4,097,818 | 6/1978 | Manoukian et al. | 372/100 |
| 4,121,883 | 10/1978 | Goshima et al. | 350/6.8 |
| 4,127,828 | 11/1978 | Klauminzer | 372/100 |
| 4,176,907 | 12/1979 | Matsumoto et al. | 350/6.8 |
| 4,190,809 | 2/1980 | Goodman et al. | 372/44 |
| 4,243,293 | 1/1981 | Kramer | 350/3.71 |
| 4,289,371 | 9/1981 | Kramer | 350/6.2 |
| 4,337,994 | 7/1982 | Brasier | 350/3.71 |
| 4,410,237 | 10/1983 | Veldkamp | 350/421 |
| 4,426,707 | 1/1984 | Martin et al. | 372/101 |
| 4,428,643 | 1/1984 | Kay | 350/3.71 |
| 4,470,659 | 9/1984 | Funato | 350/3.71 |
| 4,478,480 | 10/1984 | Doggett | 350/3.71 |
| 4,487,472 | 12/1984 | Asano | 350/3.71 |
| 4,573,758 | 3/1986 | Hecker et al. | 350/3.71 |
| 4,580,879 | 4/1986 | Wilson | 350/421 |
| 4,623,791 | 11/1986 | Kaneko et al. | 250/234 |
| 4,626,062 | 12/1986 | Ishikawa | 350/3.71 |

FOREIGN PATENT DOCUMENTS

| | | |
|---|---|---|
| 60-172020 | 9/1985 | Japan . |
| WO82/02955 | 9/1982 | PCT Int'l Appl. . |

OTHER PUBLICATIONS

"Specifying Laser Diode Optics", Laser Focus/Electro Optics, pp. 44–55; Mar. 1984, David Kuntz.

*Primary Examiner*—Rodney B. Bovernick
*Assistant Examiner*—Martin Lerner

[57] ABSTRACT

A scanner including a source of coherent light, a radial hologon, a $f\theta$ lens and a target. Between the light source and the hologon there are means for forming light from the source into a collimated beam having an oblong cross-sectional shape and for directing the beam onto the hologon at a predetermined incident angle and with the long axis of the oblong cross-sectional shape of the beam radial of the axis of rotation of the hologon. Prismatic means are provided between the hologon and the lens means for so modifying the cross-sectional shape of the beam that the spot at the target station has a selected shape and orientation. This allows the shape, orientation and size of the beam on the hologon to be optimum for duty cycle of the hologon and for spot size on the target. The prismatic means allows the spot shape and orientation on target to be optimized. The prismatic means tends to introduce undesirable bow into the scan line, therefore the wavelength of the light and the grating factor $(n \lambda)/d$ of the hologon are selected to produce an approximately equivalent opposite bow.

8 Claims, 4 Drawing Sheets

SCANNING APPARATUS

This is a continuation of application Ser. No. 848,426, filed Apr. 4, 1986 now abandoned.

CROSS REFERENCE TO RELATED APPLICATIONS

Reference is made to commonly assigned, copending patent application Ser. No. 848,427, now U.S. Pat. No. 4,707,055 issued Nov. 17, 1987 filed simultaneously herewith in the name of Richard Alan Stark and entitled SCANNING APPARATUS.

BACKGROUND OF THE INVENTION

Field of the Invention

This invention relates to scanners for creating successive sweeps of a spot of electromagnetic radiation along the same linear scan path at high frequency. Either the target at which the beam is directed is moved in a direction perpendicular to the linear scan path or the scanned beam is moved in such perpendicular direction, in order to create a raster.

Scanners may be used to write, in which case information is imposed on the beam usually prior to the creation of the successive sweeps of the beam. Scanners may also be used for reading, in which case the beam impining on the target has a constant intensity and the light reflected or transitted by the target being read is monitored to create a signal representative of the information on the scanned target.

Rotating scanners are known which include a device including a plurality of planar mirrors disposed uniformly around a cylinder. The planes of the mirrors are parallel to the axis of the cylinder and the radii through the centers of the mirrors are at uniform angular spacings around the axis. A motor rotates the device at high speed. A stationary beam of light is directed at the device which reflects the incident beam and creates successive sweeps of the light beam each along the same linear path. Such a mirror-containing device has been termed a polygon.

Scanners are also known in which a diffractive device is used instead of the reflective device for deflecting the beam. Such a diffractive device may include a disc of light-transmissive or reflective material on which are created a plurality of identical facets. Each facet contains a diffraction grating. The lines of the grating may be perpendicular to a radius bisecting the facet or they may be parallel to such a radius. The two types are termed tangential and "radial", respectively. The discs bearing the diffractive facets have come to be termed hologons.

It is known that in order to have high resolution of reading or writing information on the target, the effective portion of the beam should have a very small cross-sectional area upon impingement on the target. A focusing lens may be placed between the rotating scanning device and the target in order to focus the beam to a spot of the requirred small area. It is known that the effective diameter of the spot is inversely proportional to the diameter of the beam incident on the rotating device, i.e., the polygon or the hologon, hence a small spot requires a large beam on the rotating device.

The beam is only useful for reading or writing an image when it is wholly on a single facet of the hologon. When the beam is incident on two facets, two diffracted beams are created and each one is truncated thereby distorting the spots created on the target by these two beams. Also, one diffracted beam sweeps the end portion of a line and the other sweeps the beginning portion of a new line. At such times the system is not useful if writing an image because the same information would be written in two locations. If the system is reading an image, different information, gathered from different locations, would be read simultaneously. The duty cycle of a scanning system is defined as the ratio of active scan time to total scan time. Active scan time is defined as the time during which the beam lies wholly within one facet of the hologen. Total scan time is the time for the beam to pass a similar point on each of two successive facets. When designing scanning apparatus, a relatively small active scan time can be compensated for by increasing the data rate. However, such increase has its price and its limit. Evidently, the duty cycle of a hologon increases as the chordal dimension of the beam, where it is incident on the hologon, decreases. Thus, a high duty cycle practically requires a small chordal dimension of the beam at the hologon whereas high resolution requires that the beam have a large diameter at the hologon.

There is often a desire to further increase the speed of writing or reading. Thus, whether or not there is freedom to increase the information density, there is a desire to increase the number of scan lines produced in unit time. The number of scan lines produced in unit time is equal to the number of facets passed through the beam in unit time. Such number of facets is the product of the rotational speed of the hologon and the number of facets on the hologon. Thus, the reading or writing speed can be increased by increasing the number of facets on the hologon and by increasing the rotational speed of the hologon. Each manner of achieving higher speed has its problems. The stresses on the hologon increase with increasing speed and the power needed to drive the hologon increases rapidly with speed unless the undesirable step of putting a vacuum around the hologon is taken. If the number of facets is increased while keeping the hologon diameter and the beam shape constant, the complexity of making the hologon increases and the duty cycle decreases. In order to maintain the same duty cycle with an increased number of facets, the hologon diameter must be increased but such diameter increase greatly increases the stresses on the hologon and the power needed for the hologon drive. It is known that the power needed to drive a disc goes up approximately as the fifth power of the radius. The chordal dimension of the beam where incident on the hologon could be reduced in order to maintain the duty cycle but this would tend to adversely affect resolution of the system because the light distribution in the spot on the target is adversely affected.

The shape and orientation of the light spot on the target is also important. As stated above, for high resolution it must be small. However, it is advantageous that its cross-sectional shape be non-circular, it being larger in a direction transverse to the scan direction than it is in the scan direction. This is because the act of reading or writing one pixel of information is not instantaneous—it takes finite time. In that time the spot travels a finite distance. Thus, to read or write a circular pixel with high resolution the spot should be narrower in the direction of travel than it is in the direction transverse thereto.

Thus, it will be recognized that in creating a scanning apparatus there are many interrelated factors which have to be considered, for example, reading or writing speed, speed capability of the electronics in the read or write circuit, resolution, motor power, hologon cost, whether to put the hologon in a vacuum, and duty cycle. Many of these make conflicting demands on the shape and area of the beam.

It is an object of the present invention to provide a scanning apparatus with high resolution, high speed and acceptable motor power requirements.

SUMMARY OF THE INVENTION

According to the present invention, a scanning apparatus for providing a substantially straight line scan of a radiation spot with a selected shape and orientation, includes a source of coherent radiation with a wavelength $\lambda$ and a radial hologon mounted for rotation about an axis. The hologon has at least one pattern of parallel grating lines with pitch d. Also, it includes means for forming radiation from the source into a collimated beam having an oblong cross-sectional shape and for directing the beam onto the hologon at a predetermined incident angle and with the long axis of the oblong cross-sectional shape of the beam being radial of the axis of rotation of the hologon. A target station receives the scanned beam. Lens means between the hologon and the target station focusses the beam to a spot at the target station. Prismatic means between the hologon and the lens means so modifies the cross-sectional shape of the beam that the spot at the target station has the selected shape and orientation. The wavelength of the radiation and the grating factor $(n \lambda)/d$ (wherein n is the grating order number) of the hologon are selected to produce a bow in the scanned beam incident on the prismatic means approximately equal and opposite to the bowing tendency imposed by the prismatic means on the scanned beam whereby the scan line at the imaging station is substantially straight.

Such a scanning apparatus is advantageous because the prismatic means enables the beam cross-sectional shape to be expanded in the direction perpendicular to the scan direction. Such an ability allows the use of a beam cross-sectional shape at the hologon which is long in a direction radially of the hologon and narrow in the chordal direction. The ability to narrow the beam shape in the chordal direction allows an increase in the duty cycle without increasing the motor speed and power whereby the reading or writing speed may be increased without having to resort to higher speed electronics in the writing or reading circuit. The high duty cycle is achieved without reducing the number of facets and without increasing the diameter of the hologon. Because the chordal dimension of the beam can be reduced independently of the radial dimension, the cross-sectional area of the beam at the hologon need not be reduced in a manner which would adversely affect the distribution of the energy in the spot at the target.

BRIEF DESCRIPTION OF THE DRAWINGS

A preferred embodiment of the present invention will now be described, by way of example, with reference to the accompanying drawings, in which.

Figure 1:
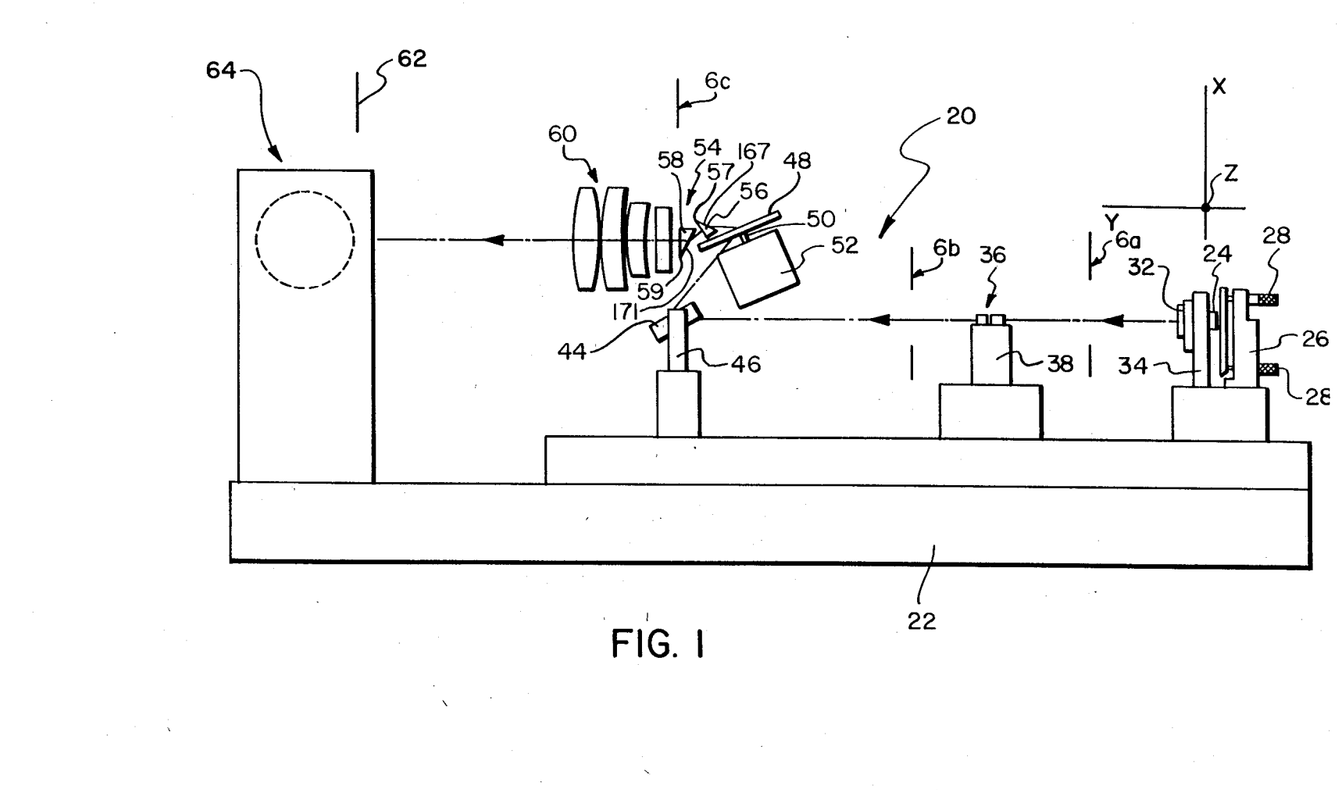
FIG. 1 is a schematic representation of a side elevation of scanning apparatus, in accordance with the present invention, for writing information on film.

In order to assist the understanding of the ensuing description, orthogonal X, Y and Z axes are oriented as shown in FIG. 1. Thus, the plane of FIG. 1 is in the XY plane. The overall direction of the light beam is in the Y direction. An indication of the orientation of the X, Y, Z axes is included in most of the figures of the drawings to aid in the understanding of the orientation of the components illustrated in each figure.

The scanning apparatus 20 illustrated in FIG. 1 includes a rigid base 22, extensive in the Y direction and having its surface parallel to the XY plane, on which all of the optical components are mounted so that unwanted relative motion of the components is avoided.

The apparatus 20 includes a source of coherent radiation, in this embodiment, infrared light. In this embodiment the source is a laser diode 24, carried by a mount 26. Vernier adjustment devices 28 enable the inclination of the axis 30 of the output beam 29 to the Y axis to be adjusted (see FIG. 2). The diode 24 is so mounted as to direct its output beam 29 to the left, as seen in FIG. 1, in the Y direction.

Modulating means are provided for modulating the output of the laser diode 24 in accordance with information contained in a stream of electronic signals. Such modulating means are well known and are neither illustrated in the accompanying drawings nor described further herein.

Figure 6A:
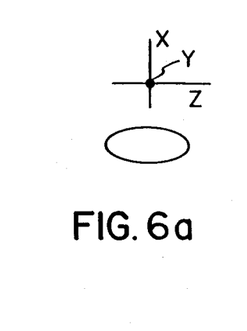
FIGS. 6a, b, c, and d represent the cross-sectional shape and orientation of the beam at various locations in the apparatus illustrated in FIG. 1.

The cross-sectional shapes and angles of divergence in orthogonal directions of the beams emitted by different laser diodes vary. In the present embodiment, the diode 24 produces a divergent beam 29 (see FIG. 2) which has an elliptical cross-section, the dimension in the Z direction being greater than that in the X direction. The beam 29 is incident on a collimating lens system 32 which is carried by a mount 34 extending from the base 22. The lens system 32 collimates the light beam but does not alter its cross-sectional shape. Thus, the beam leaving the lens system has at, for example, XZ plane 6a in FIG. 1, a cross-sectional shape as illustrated in FIG. 6a.

Figures 2, 3:
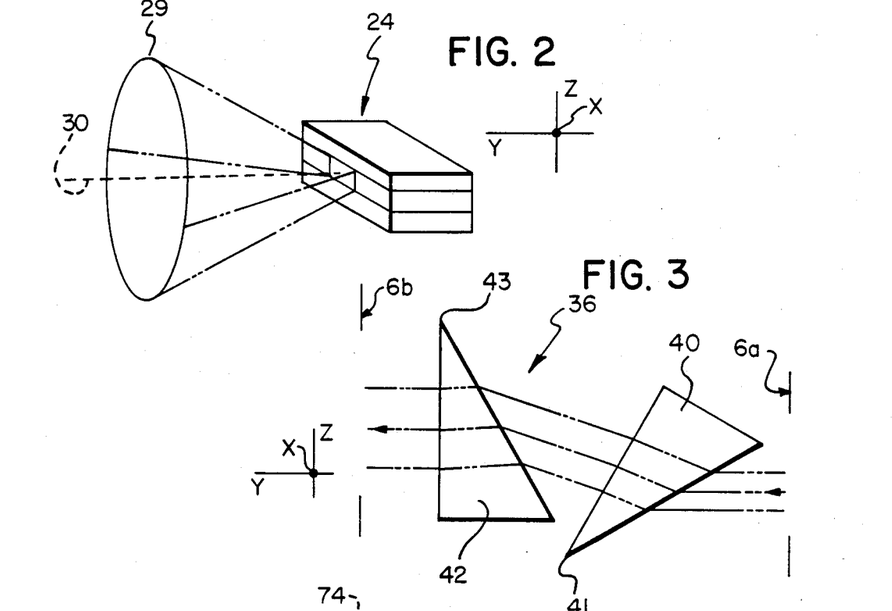
FIG. 2 is a schematic perspective view of a laser diode included in the apparatus illustrated in FIG. 1 with the beam produced by the diode represented.
FIG. 3 illustrates prismatic means included in the apparatus illustrated in FIG. 1.

The ratio of the major and minor axes of the cross-sectional shape of the beam at 6a is not as great as is desired for the beam when incident on the hologon. In other embodiments the beam might have the desired shape; however, in the present embodiment it does not. Therefore, anamorphic beam expansion means, in the present example, prismatic means 36, are disposed in the path of the beam after the collimating lens system 32. The prismatic means 36 are supported from the base 22 by a mount 38. In the present embodiment, the prismatic means 36 includes two prisms (see also FIG. 3) disposed with the apexes 41, 43 of their wedge angles parallel to the X axis. In this disposition the prisms refract only in the YZ plane. The prisms 40, 42 are so disposed as to enlarge the dimension of the beam in the Z direction and to transmit it onwards parallel to the incident beam, i.e. in the Y direction, as can be seen in FIG. 3.

An advantage of having two prisms instead of one is that the desired anamorphic beam expansion can be achieved with the output beam substantially parallel to the incident beam.

The collimating lens system 32 and the anamorphic beam expansion means together form means for forming light from the source into a collimated beam having an oblong cross-sectional shape.

Instead of prismatic means, a cylindrical lens system could be used as the anamorphic beam expansion means.

Figure 6B:
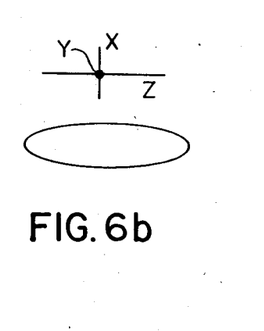

The beam emerging from the prismatic means 36 has (at plane 6b in FIG. 1) a cross-sectional shape as seen in FIG. 6b. The dimension in the X direction is the same as that of the beam incident on the prismatic means 36 but the dimension in the Z direction has been increased.

The beam is next incident on a diffraction grating 44 supported by a mount 46 extending from the base 22. The plane of the diffraction grating is parallel to the plane of the hologon to be described. The grating lines are parallel to the Z axis. The diffraction grating 44 has the same characteristics as those of each facet of the hologon. The purpose of the diffraction grating will be described below. An effect of the grating 44 on the beam is to fold it with its axis remaining in the XY plane. The cross-sectional shape of the beam after diffraction by the grating remains as shown in FIG. 6b.

The beam is next incident on a hologon 48 carried by the shaft 50 of a motor 52. The motor 52 is supported from the base 22 by a support (not shown). The effect of the hologon on the beam will be described in detail below. It will suffice, at present, to say that the hologon diffracts the beam so that it again travels with a major component in the Y direction but when the hologon is rotated it causes the beam to scan, i.e., it gives it a sweeping component in the Z direction.

Figure 5:
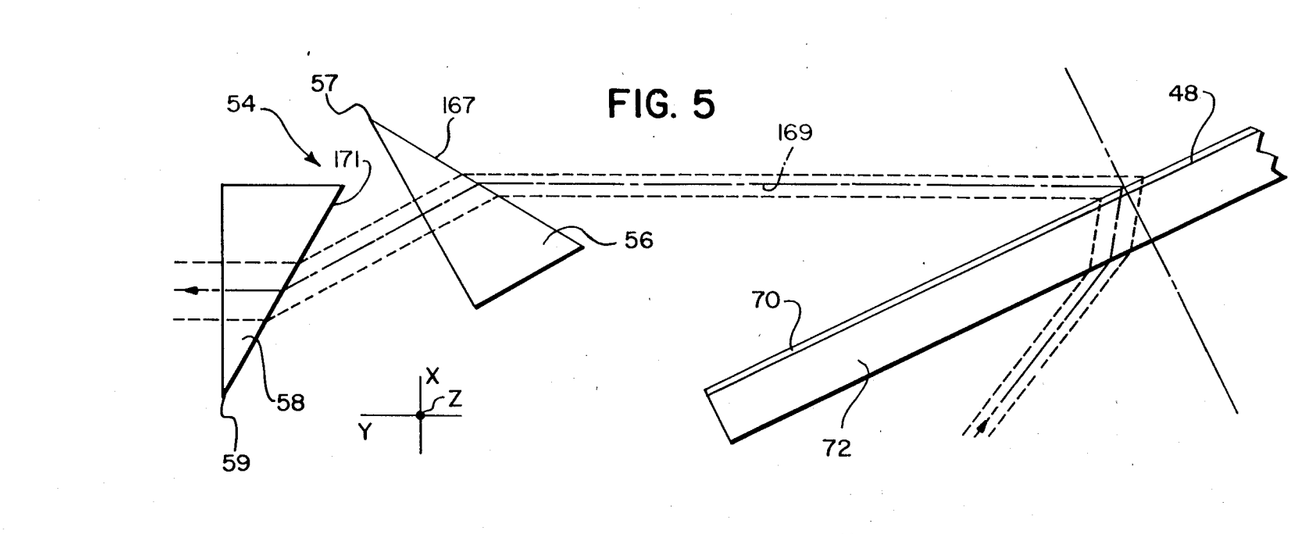
FIG. 5 illustrates further prismatic means and a portion of the hologon included in the apparatus, and the ray path through the hologon and the further prismatic means.
Figure 6C:
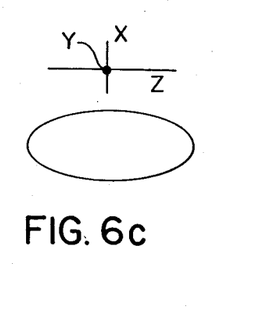

The beam is next incident on second prismatic means 54, which is supported from the base 22 by a support (not shown). The support for the prisms 56, 58 is described in detail in the above-referenced copending patent application (the disclosure of which is specifically incorporated herein by reference) and reference is directed to that application for an understanding of the amount. The prismatic means 54 includes, in the present embodiment, two prisms 56,58 (see FIG. 5) disposed with the apexes (57, 59) of their wedge angles parallel to their Z axis. The prisms 56, 58 are so disposed as to increase the dimension of the beam in the X direction. They do not affect the dimension in the Z direction, but the ratio of the dimensions is changed. The beam, after leaving the prism 58, has a shape (at YZ plane 6c) as illustrated in FIG. 6c and is directed generally parallel to the Y axis. Advantages of two prisms instead of one are that greater magnification can be obtained and the output beam may be parallel to the incident.beam which would not be the case with one prism. However, embodiments of the present invention may be constructed in which the prismatic means downstream of the hologon consists of a single prism or more than two prisms.

Figure 6D:
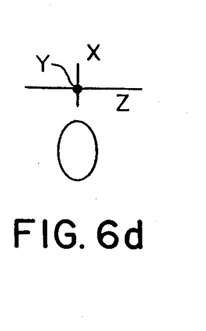

The scanning beam is incident upon a lens means 60 which serves to focus it onto a target in a plane 62 at a target station 64 which is mounted on the base 22. The beam impinges on the target in the form of a spot having a shape as illustrated in FIG. 6d in which the major dimension is now oriented parallel to the X axis. The reversal of the relative magnitudes of the dimensions in the X and Z directions is caused by the focussing lens 60. The form of the target is not material to an understanding of the present invention. It may be of sheet form or of continuous web form. It is sensitive to the energy in the radiation from the laser so that some form of image is formed on it. The image may be, for example, electrostatic or exposed silver halide. In this embodiment, the light-sensitive material is moved in the X direction, i.e., perpendicular to the scan direction (the Z direction) at a controlled rate to create a raster pattern. In other embodiments, the target material is kept stationary and the beam is deflected also in the direction perpendicular to the scan direction, as by a mirror whose inclination to the incident beam is changed in known manner.

It is known that when the current to laser diode is varied in order to modulate the output of the diode, the wavelength of its emitted radiation varies. If the incident angle of the beam on the hologon 48 is constant, variations in the wavelength will cause variations in the angle of the diffracted beam. This causes artifacts in an image being written by the beam. The diffraction grating 44 upstream of the hologon avoids the undesirable effects of wavelength changes. In essence, when the wavelength changes, the grating 44 causes the angle of incidence on the hologon 48 to change such that with the changed wavelength the diffracted angle remains constant.

The above description is intended to give a general understanding of the apparatus. The ensuing description will go into greater detail.

Figure 4:
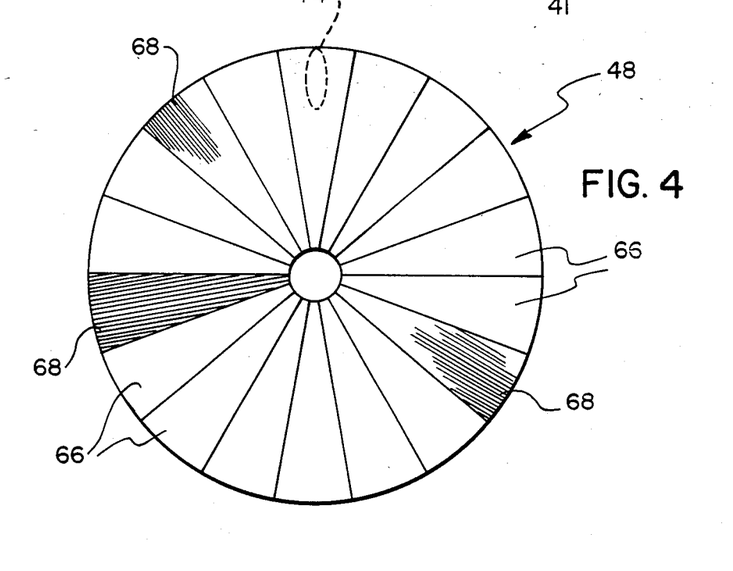
FIG. 4 illustrates a radial hologon included in the apparatus illustrated in FIG. 1.

The hologon 48 is a multi-facet hologon, as may be seen in FIG. 4. In the present example, there are eighteen identical facets 66. Each facet 66 contains a diffraction grating 68. The lines of the grating in each facet are parallel to the radius which bisects the facet. While some grating pattern lines are shown in FIG. 4, it will be recognized that they are both incomplete and merely representative. The actual number of lines per mm is 2162 in the present embodiment wherein the wavelength of the electromagnetic radiation emitted by the laser diode is $0.830 \times 10^{-3}$ mm. The diffraction gratings 68 are formed in a photographic layer 70, formerly photosensitive, carried by a transparent glass support 72.

A broken line ellipse 74 represents the shape and orientation of the beam as it is incident on the hologon 48. It will be observed that the beam is incident contiguous with the periphery of the disk. This maximizes the duty cycle because the ratio of the chordal dimension of the facet measured through the ellipse 74 to the dimension of the ellipse in the same chordal sense, is a maximum if the ellipse is as radially far out as possible.

The ellipse 74 is shown in the middle of a facet 66 and in this disposition its major axis is parallel to the grating lines in the facet. In this disposition, the diffracted beam is parallel to the Y axis and has no component in the Z axis. As the hologon 48 rotates, from the position illustrated in FIG. 4, the grating lines become progressively inclined to the major axis of the ellipse. This progressive inclination causes the diffracted beam to have a progressively increasing component in the Z direction. Assuming that the beam is incident on the hologon behind the shaft 50 (as seen in FIG. 1) and the hologon is rotated clockwise as seen in FIG. 4 and as looked down upon from above in FIG. 1, the beam will have a Z axis component directed into the plane of the paper bearing FIG. 1. As the hologon continues to rotate, the Z axis component will increase. Eventually, a portion of the beam will be incident on the next adjacent facet and that portion of the beam will be diffracted with a maximum Z axis component directed out of the paper bearing FIG. 1 and, at the same time, the portion of the beam still on the previous facet has a maximum component in the Z direction into the paper. Continued rotation of the hologon causes the portion of the beam on the previous facet to diminish to zero. Such continued rotation also causes the Z axis component out of the paper to diminish eventually to zero (i.e., by the time the beam is again on the center of the facet) and subsequently to become a progressively increasing Z axis component into the paper. Thus, the beam downstream of the hologon repetitively scans as successive facets intercept it. There is no flyback, as there is in television scanning, but there is a time when there are two output beams from the hologon. The apparatus, when used for image creation, is not useful for writing during the time when there are two beams coming from the hologon and because of this, signaling means are provided for signaling the start and, possibly, the finish of the useful portion of each scan line. These signaling means are well known and are not illustrated or described in detail herein. Suffice it to say that they include two sensors positioned to be impinged upon by the scanning beam just after the first beam has ceased and just before the second beam starts again, respectively. The start sensor signals the laser modulating circuitry to initiate modulation of the laser diode output and, if provided, the finish sensor could cause sensation of the modulation of the laser diode output. During the time the diode is not modulated the incoming information is temporarily stored, if the information is being supplied continuously in real time. If the information is being drawn from memory then it is drawn from memory only during the scanning of the useful portion of each scan line.

The beam leaving the hologon has a cross-sectional area much larger than is desired for the spot of light impinging on the target. The lens system 60 reduces the area of the beam to its desired value on the target and maintains focus of the spot on the planar target as the spot scans. It is commonly called a f$\theta$ lens. Such a lens system is known and further description will not be given herein. Such lens systems are often referred to as f$\theta$ lenses.

While the desired cross-sectional area of the beam on the target can be achieved by appropriate selection of the f$\theta$ lens system 60, its shape cannot. Therefore, the prismatic means 54 is included to perform the desired change of X:Z dimension ratio on the beam before it enters the lens system. It must be recognized that the lens means 60, in effect, transposes the X:Z dimension ratio of the beam. For example, an X:Z dimension ratio of 1:2 of the beam entering the lens system would appear as an X:Z dimension ratio of 2:1 at the target. Thus, if one wishes to increase the X:Z dimension ratio at the target, one decreases the X:Z dimension ratio between the hologon 48 and the lens system 60.

As an example, it is desired to have an X:Z dimension ratio of the spot on the target of 1.4:1 (FIG. 6d). Thus, the X:Z dimension ratio at plane 6c, i.e. the input to the lens system, should be 1:1.4. However, the X:Z dimension ratio of the beam leaving the hologon is 1:4 in order to maximize the duty cycle. The prismatic means 54 changes the beam ratio from 1:4 to 1:1.4 which is achieved by an expansion in the X direction. Thus, the prismatic means 54 performs an advantageous role in achieving the desired shape of the spot on the target 64. Without it there would have to be a compromise between optimizing spot shape on the target and optimizing duty cycle of the hologon. However, the prismatic means 54 has an undesirable effect in that it creates an X component in the beam which is dependent upon the instantaneous angular displacement of the beam axis from the Y axis. In other words, the prismatic means tends to put a bow in the path of the spot on the target. Such bow is undesirable if the apparatus is writing an image and the information in each scan line is information drawn from a straight line in the original. The effect is deemed retrogressive and undesirable because it is possible to design a system in which the beam from the hologon scans a substantially straight line.

According to the present invention, the beam leaving the hologon is intentionally bowed in a sense opposite to the bow created by the prismatic means and, so far as is possible, with a magnitude equal to the bow created by the prismatic means so that the path of the spot is as straight as possible.

Figure 7:
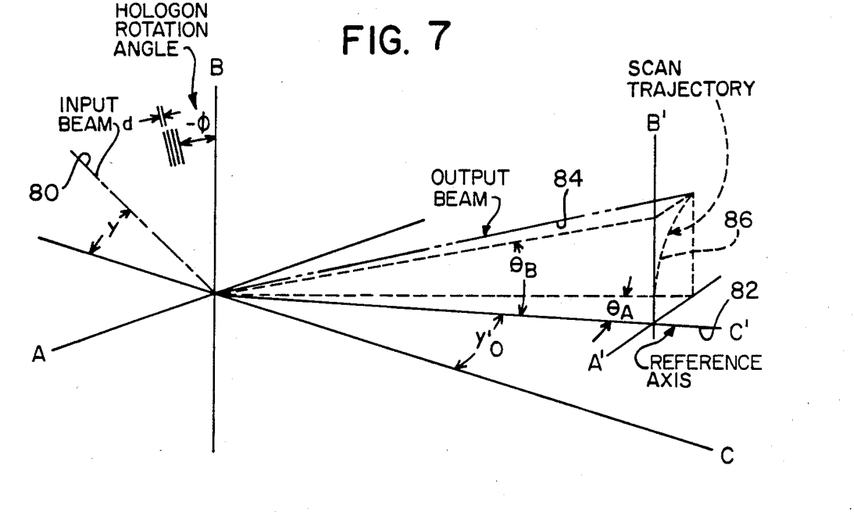
FIG. 7 represents the diffraction caused by the hologon, and a portion of the path of the scanning line.

In order to understand how the path of the scanning line downstream of the hologon may have a desired bow, reference is now made to FIG. 7 which represents the diffraction caused by the hologon, and the path of the scanning line.

Because the plane of the hologon is inclined to the X and Z axes, a different system of orthogonal axes is established for this analysis.

A, B and C are orthogonal axes.

The hologon lies in the AB plane.

The input beam 80 lies in the AC plane and is inclined at angle $\gamma$ to the C axis. $\gamma$ is the incident angle.

$\phi$ is the instantaneous angle of rotation of the hologon from a condition in which the input beam is incident and centered upon a radius bisecting the facet.

82 is the output beam when $\phi=0$ and it is in the AC plane. It is termed the reference axis following the hologon and corresponds to mid-scan location of the beam. It is inclined at angle $\gamma'_o$ to the C axis.

A' and B' are orthogonal to C'; B' being parallel to B.

84 is the instantaneous output beam. It is inclined at $\theta_B$ to the A'C' plane and at $\theta_A$ to the C'B' plane.

$\theta_B$ is termed the in-track scan angle.

$\theta_A$ is termed the cross-track angle, and defines the instantaneous displacement of the spot on the target from a straight line scan. Thus, $\theta_A$ is a measure of the bow of the spot path.

86 is the scan trajectory and is the path actually followed by the spot.

The two scan components $\theta_B$ and $\theta_A$ shown in FIG. 7 are described by the expressions:

$$\theta_B = \tan^{-1}\left(\frac{-E}{CD + AB}\right)$$

$$\theta_A = \tan^{-1}\left(\frac{CB - DA}{CD + AB}\right)$$

where
$A = [\cos^2\gamma - G^2 + 2G \sin\gamma \cos\phi]^{\frac{1}{2}}$
$B = [\cos^2\gamma - G^2 + 2G \sin\gamma]^{1/2}$
$C = \sin\gamma - G \cos\phi$
$D = \sin\gamma - G$ $E = G \sin\phi$ $G = (n\lambda)/d$ (the grating factor)

n is the grating order number (the first diffraction order is used, therefore n = +1)

λ is the wavelength of the radiation emitted by the diode d is the pitch of the diffraction grating It is known that for minimum sensitivity of the system to wobble of the hologon, the angles $\gamma$ and $\gamma'$ should be equal. Therefore, the textbook grating relationship $$\sin\gamma + \sin\gamma' = (n\lambda)/d$$

becomes $$2\sin\gamma = (n\lambda)/d$$

and hence $$\gamma = \sin^{-1}(G/2)$$

By introducing this condition for minimum wobble sensitivity into the general scan trajectory equations above, it is found that the two scan components $\theta_B$ and $\theta_A$ can be expressed as functions only of the grating factor G and the hologon rotation angle $\phi$, becomes $$A = [1 - G^2(5/4 - \cos\phi)]^{1/2}$$

$$B = \tfrac{1}{2}(4 - G^2)^{\tfrac{1}{2}}$$

$$C = G(\tfrac{1}{2} - \cos\phi)$$

$$D = -\tfrac{1}{2}G$$

$$E = G \sin\phi$$

The above analysis shows that a desired trajectory of the output beam can be approximated to by an appropriate choice of the grating factor G which, essentially, means by an appropriate choice of λ/d. As the range of radiation sources available is limited, practically, the selection of an appropriate grating factor comes down to a selection of the appropriate grating pitch.

Standard optical analyses may be used for designing the prisms needed to create the desired spot shape from the shape of the beam at the hologon. The bow created by the prismatic means is determined and the value of λ/d necessary to create a compensating bow is then determined. Thus, a laser diode with a known wavelength having been selected, the grating pitch d is defined and a hologon is made with that pitch d.

With the grating factor G having been now determined the incident and diffracted angles are calculated from $$\sin\gamma + \sin\gamma' = (n\lambda)/d$$

and the system is set up with this value of incident and diffracted angle at the hologon.

In one specific embodiment of the present invention there are the following values for the various parameters:

| Hologon | |
|---|---|
| Number of facets | 18 |
| grating pitch | 0.4624 μm |
| beam input (and output) angle | 63.82° |
| diameter | 4.5 inches |
| Prism 56 | |
| refractive index | 1.1710 |
| apex angle | 30° |
| incident angle at mid scan | 59° 14' |
| Prism 58 | |
| refractive index | 1.1710 |
| apex angle | 30° |
| incident angle at mid scan | 59° 14' |
| aspect ratio of beam on the hologon | 4:1 |
| shape of spot on the target | elliptical (1:4) |

It will be recognized that the prismatic means between the hologon and the $f\theta$ lens would provide the same beam shaping role if they were rotated, as a unit, through 180° about an axis parallel to the Y axis. However, in this case the bow created by the prismatic means would be in the opposite sense. Thus, to counteract that bow the hologon would be so designed as to create a bow in the opposite sense. The pitch of the diffraction grating would be different and the incidence angle of the beam in the hologon would be different.

In the embodiment specifically described above, the two prisms 56 and 58 are identical. Embodiments may be constructed in which the prisms are not identical.

In the above description, mention has been made of the shape and size of the spot on the target. Those skilled in the art know that the intensity profile of the light energy in the beam where incident on the hologon is gaussian. Also, if it is assured that the beam does not fill a facet of the hologon and does not fill the $f\theta$ lens, so that there is no significant truncation of the beam, then the spot on the target also has a gaussian profile. The desired size of the spot may vary for different purposes. For example, for half-tone reproduction, the individual pixels should be distinct and this is achieved by having very little overlap of the spots creating successive pixels.

If beam expanding prismatic means are inserted between a tangential hologon and a $f\theta$ lens, beam expansion may be achieved but it is at the cost of deflection sensitivity. In other words, angular magnification is the inverse of beam expansion. Reduced deflection sensitivity would require a longer focal length $f\theta$ lens to achieve a desired length of scan line. If the same spot diameter on the target is to be achieved, a larger beam diameter at the hologon would be required. This negates the advantage of the prismatic means between the hologon and the $f\theta$ lens. However, it is a part of the present invention to discover that beam shaping along the path of the beam to optimize performance while not achievable with a tangential hologon is achievable with a radial hologon.

What is claimed is:

1. Scanning apparatus for providing a substantially straight line scan of a radiation spot with a selected shape and orientation comprising:

a source of coherent radiation having a wavelength λ;

a radial hologon mounted for rotation about an axis and having at least one pattern of parallel grating lines with a pitch d;

means for forming radiation from said source into a collimated beam having an oblong cross-sectional shape and for directing said beam onto the hologon at a predetermined incident angle and with the long axis of the oblong cross-sectional shape of the beam, where incident on the hologon, being radial of the axis of rotation of the hologon;

a target station for receiving the scanned beam;

lens means between the hologon and the target station for focusing the beam to a spot at the target station; and prismatic means between the hologon and the lens means for so modifying the cross-sectional shape of the beam that the spot at the target station has the selected shape and orientation;

the wavelength of the radiation and the grating factor $(n\lambda)/d$ (wherein n is the grating order number) of the hologon being selected to produce a bow in the scanned beam between the hologon and the prismatic means approximately equal and opposite to the bowing tendency imposed by the prismatic means on the scanned beam whereby the scan line at the imaging station is substantially straight.

2. Scanning apparatus as claimed in claim 1 wherein said means for forming light from said source into a collimated beam having an oblong cross-sectional shape includes a collimating lens system.

3. Scanning apparatus as claimed in claim 1, wherein said means for forming light from said source into a collimated beam having an oblong cross-sectional shape includes an anamorphic system.

4. Scanning apparatus as claimed in claim 3, wherein said anamorphic system includes prismatic means.

5. Scanning apparatus as claimed in claim 4, wherein said prismatic means included in said anamorphic system includes two prisms so disposed that the output lens is parallel to the input beam and the output beam has a predetermined oblong cross-sectional shape.

6. Scanning apparatus as claimed in claim 1, wherein the angle of the beam incident upon the hologon is substantially equal to the angle of the beam diffracted by the hologon as measured from the reference axes of the hologon.

7. Scanning apparatus as claimed in claim 1, wherein said prismatic means between the hologon and the said lens means includes two prisms so disposed that the beam passes through the prisms in succession.

8. Scanning apparatus as claimed in claim 7, wherein the source of coherent light emits at a wavelength of 830 nm;

the frequency of the grating lines in each facet of the hologon is 2162 lines per mm;

the incident and diffracted angles of the beam at the hologon are equal;

each of said two prisms encountered by said beam having a first face at which the beam enters the respective prism and a second face at which it leaves the prism, each said first face being disposed at an angle of 59° 14′ to the incident beam when the beam is output from the hologon with no component in a plane containing the axis of rotation of the hologon and the point of incidence of the beam on the hologon; and the apex angles of said first and second prisms being 30°.

* * * * *

UNITED STATES PATENT AND TRADEMARK OFFICE
CERTIFICATE OF CORRECTION

PATENT NO. : 4,904,034

DATED : Feb. 27, 1990

INVENTOR(S) : B. Narayan et al

It is certified that error appears in the above-identified patent and that said Letters Patent is hereby corrected as shown below:

Column 11, line 31, "output lens" should read --output beam--.

Signed and Sealed this

Third Day of December, 1991

Attest:

HARRY F. MANBECK, JR.

*Attesting Officer*   *Commissioner of Patents and Trademarks*